US010800710B2

(12) United States Patent
Veljkovic et al.

(10) Patent No.: US 10,800,710 B2
(45) Date of Patent: Oct. 13, 2020

(54) APPARATUS AND METHODS FOR GRIPPING FLEXIBLE MATERIALS

(71) Applicant: General Electric Company, Schenectady, NY (US)

(72) Inventors: Danilo Veljkovic, Ypsilanti, MI (US); Robert Hanet, Canton, MI (US); James Anthony Ruud, Delmar, NY (US); Thomas Joseph Post, West Bloomfield, MI (US)

(73) Assignee: General Electric Company, Schenectady, NY (US)

( * ) Notice: Subject to any disclaimer, the term of this patent is extended or adjusted under 35 U.S.C. 154(b) by 259 days.

(21) Appl. No.: 15/866,509

(22) Filed: Jan. 10, 2018

(65) Prior Publication Data

US 2019/0210932 A1 Jul. 11, 2019

(51) Int. Cl.
*C04B 41/45* (2006.01)
*C04B 35/80* (2006.01)
(Continued)

(52) U.S. Cl.
CPC .......... *C04B 41/4584* (2013.01); *B23P 13/02* (2013.01); *B28B 1/522* (2013.01);
(Continued)

(58) Field of Classification Search
CPC . C04B 41/4584; C04B 35/565; C04B 35/806; B28B 1/522; B28B 23/0006; B28B 23/022; B28B 11/12; B65H 5/085; B65H 5/14; B23P 13/02; B26F 3/002; Y10T 29/49801
See application file for complete search history.

(56) References Cited

U.S. PATENT DOCUMENTS 5,518,231 A 5/1996 Reddy
6,428,267 B1 8/2002 Terpstra
(Continued)

FOREIGN PATENT DOCUMENTS

DE 102007009629 A1 8/2008

OTHER PUBLICATIONS

Wang et al., "A Constant-Force Compliant Gripper for Handling Objects of Various Sizes", Journal of Mechanical Design, vol. 136, Issue: 07, pp. 10, Apr. 28, 2014.
(Continued)

*Primary Examiner* — Jermie E Cozart
(74) *Attorney, Agent, or Firm* — Dority & Manning, P.A.

(57) ABSTRACT

A ceramic fiber processing apparatus and method for processing ceramic fibers for the manufacture of ceramic matrix composites (CMCs) is provided. The apparatus includes a frame including a plurality of unidirectional ceramic fibers wound thereabout and extending across a void therein the frame to define a first planar array of ceramic fibers and a second planar array of ceramic fibers. During use, the frame is disposed in the ceramic fiber processing apparatus in a manner to enable gripping of the first planar array of ceramic fibers with a first gripper assembly and gripping of the second planar array of ceramic fibers with a second gripper assembly. A cutting mechanism provides cutting of the plurality of unidirectional ceramic fibers to separate the first planar array of ceramic fibers and the second planar array of ceramic fibers from one another.

20 Claims, 16 Drawing Sheets

(51) Int. Cl.
  *B65H 5/08* (2006.01)
  *B65H 5/14* (2006.01)
  *B28B 1/52* (2006.01)
  *C04B 35/565* (2006.01)
  *B28B 23/00* (2006.01)
  *B28B 23/02* (2006.01)
  *C22C 47/06* (2006.01)
  *B23P 13/02* (2006.01)
  *B28B 11/12* (2006.01)
  *B26F 3/00* (2006.01)

(52) U.S. Cl.
  CPC ........ *B28B 23/0006* (2013.01); *B28B 23/022* (2013.01); *B65H 5/085* (2013.01); *B65H 5/14* (2013.01); *C04B 35/565* (2013.01); *C04B 35/806* (2013.01); *C22C 47/06* (2013.01); *B26F 3/002* (2013.01); *B28B 11/12* (2013.01); *C04B 2235/3826* (2013.01); *C04B 2235/5224* (2013.01); *C04B 2235/5228* (2013.01); *C04B 2235/5244* (2013.01); *C04B 2235/5248* (2013.01); *C04B 2235/5252* (2013.01); *C04B 2235/5268* (2013.01); *Y10T 29/49801* (2015.01)

(56) References Cited

U.S. PATENT DOCUMENTS

| | | |
|---|---|---|
| 8,253,520 B2 | 8/2012 | Yang |
| 2017/0144329 A1 | 5/2017 | Dunn et al. |
| 2017/0144925 A1 | 5/2017 | Dunn et al. |

OTHER PUBLICATIONS

Dadkhah et al., "A self-aligning gripper using an electrostatic/gecko-like adhesive", Intelligent Robots and Systems (IROS), 2016 IEEE/RSJ International Conference on, pp. 1006-1011, 2016, Daejeon.

APPARATUS AND METHODS FOR GRIPPING FLEXIBLE MATERIALS

The present disclosure is generally directed to methods and apparatus for gripping flexible material. More particularly, the present disclosure is directed to apparatus and method for gripping ceramic fibers for the manufacture of ceramic matrix composite (CMC) articles.

BACKGROUND

Ceramic matrix composites (CMCs) generally comprise a ceramic fiber reinforcement material embedded in a ceramic matrix material. The reinforcement material may be discontinuous short fibers that are randomly dispersed in the matrix material or continuous fibers or fiber bundles oriented within the matrix material. The reinforcement material serves as the load-bearing constituent of the CMC in the event of a matrix crack. In turn, the ceramic matrix protects the reinforcement material, maintains the orientation of its fibers, and serves to dissipate loads to the reinforcement material. Silicon-based CMCs, such as silicon carbide (SiC) as the matrix and/or reinforcement material, have become of particular interest in high-temperature applications due to their high temperature capabilities, such as for use in components of gas turbines, including aircraft gas turbine engines and land-based gas turbine engines. SiC fibers have also been used as a reinforcement material for a variety of other ceramic matrix materials, including TiC, $Si_3N_4$, and $Al_2O_3$.

Continuous fiber reinforced ceramic composites (CFCC) are a particular type of CMC that offers light weight, high strength, and high stiffness for a variety of high temperature load-bearing applications, such as in shrouds, combustor liners, vanes (nozzles), blades (buckets), and other high-temperature components of gas turbines. A notable example of a CFCC material developed by the General Electric Company under the name HiPerComp® contains continuous SiC fibers in a matrix of SiC and elemental silicon or a silicon alloy.

Various techniques may be employed in the fabrication of CMCs, including chemical vapor infiltration (CVI), wet drum winding, lay-up, lamination, pyrolysis, and melt infiltration (MI). These fabrication techniques have been used in combination with tooling or dies to produce near-net-shape articles through processes that include the application of heat and chemical processes at various processing stages. Examples of such processes, particularly for SiC/Si—SiC (fiber/matrix) CFCC materials, are disclosed in U.S. Pat. Nos. 5,015,540, 5,330,854, 5,336,3104, 5,628,938, 6,024, 898, 6,258,737, 6,403,158, and 6,1043,441, and U.S. Patent Application Publication No. 2004/0067316.

One process of manufacturing CMCs entails the use of CMC prepregs, which are typically sheet-like structures comprising the reinforcement fibers impregnated with a slurry that contains a precursor of the matrix material and one or more organic binders. The prepreg must undergo processing (e.g., firing) to convert the precursor to the desired ceramic matrix material. Prepregs for CFCC materials frequently comprise a two-dimensional fiber array comprising a single layer of aligned tows (bundles of individual filaments) impregnated with a matrix precursor to create a generally two-dimensional lamina. Multiple plies of the resulting prepregs are then stacked and debulked to form a laminate preform, a process referred to as "lay-up." The prepregs are typically, but not necessarily, arranged so that tows of adjacent prepregs are oriented transverse (e.g., perpendicular) to each other, providing greater strength in the laminar plane of the preform (corresponding to the principal (load-bearing) directions of the final CMC article). As an example, FIG. 1 represents a surface region of a CMC article 10 including multiple laminae 12, each the result of individual prepreg tapes or sheets. As also shown in FIG. 1, each lamina 12 contains a ceramic reinforcement made up of unidirectionally-aligned fibers 14 encased in a ceramic matrix 16 formed by conversion of the ceramic matrix precursor (e.g., after firing).

As illustrated in FIG. 2, one typical process utilized in making prepreg CMC preforms includes a winding technique to form the fibers 14 (individual filaments or tows) into a unidirectional prepreg tape, which is then used for the lay-up of the composite preform. As represented in FIG. 2, some winding techniques involve coating the fibers 14 to form a coated fiber 18. As illustrated in FIG. 2, a winding technique may also form the coated fiber 18 (a filament or tow) into a unidirectional prepreg tape by impregnating the coated fiber 18 with a matrix precursor to yield a precursor-impregnated fiber 20. For example, a wet drum winding process for impregnating the coated ceramic fiber 18 may entail pulling the coated ceramic fiber 18 through a bath of a matrix precursor slurry mixture 22 that includes suitable matrix precursor materials, organic binders, and solvents, as shown in FIG. 2. The resulting precursor-impregnated fiber 20 is then wound around a drum 24 to form a planar unidirectional prepreg tape. Prepreg tapes produced by such a wet drum winding processes may have a surface roughness, or waviness, corresponding to the pitch of the precursor-impregnated fiber 20 on the drum 24. There may also be variability in the distribution of fiber and matrix across the tape because of the pitch. Furthermore, because the fiber is under tension during the winding process, the impregnated fiber 20 may tend to be pulled down onto the drum surface, yielding a prepreg tape that has proportionally more fiber at the surface of the tape contacting the drum 24 and proportionally more matrix precursor at the surface of the tape facing away from the drum 24.

As illustrated in FIG. 3, another process utilized in making prepreg CMC preforms includes a technique that utilizes a frame 30 to form a plurality of ceramic fibers 14 into a unidirectional prepreg tape, which is then used for the lay-up of the composite preform. The method includes providing a frame 30 including a planar array of unidirectional ceramic fibers 14 extending across a void 32 thereof. In this way, the void 32 may expose the ceramic fibers 14. The method further includes depositing a coating on the ceramic fibers 14 in the frame 30 to form a ribbon of coated fibers 18. As illustrated, the frame 30 may be a two part frame that sandwiches the ends of the ceramic fibers 14 therebetween so as to retain the fibers 14 across the void 32 during coating. The coated fibers 18 go through additional processes, such as the transferring of the ribbon of coated fibers 18 from the coating frame 30 to a pre-preg station (not shown) in order to produce a CMC tape. The step of transferring requires that the ribbon of coated fibers 18 be gripped or clamped in a specific manner, such as through the use of gripper fingers. Gripping flexible materials, such as the ribbon of coated fibers 18, with very long gripper fingers does not provide equal gripping force along a full width of the flexible material.

Accordingly, alternative methods and apparatus for coating and/or impregnating ceramic fiber (to form prepregs) for producing CMCs with improved yield or throughput are desirable.

BRIEF DESCRIPTION

In one aspect, the application provides for a method of processing a plurality of ceramic fibers in a ceramic fiber processing apparatus for the manufacture of a ceramic matrix composite (CMC) article. The method includes providing a frame including a plurality of unidirectional ceramic fibers disposed thereabout and extending across a void therein the frame to define a first planar array of ceramic fibers and a second planar array of ceramic fibers. The method further comprises disposing the frame in the ceramic fiber processing apparatus, gripping the first planar array of ceramic fibers with a first gripper assembly and gripping the second planar array of ceramic fibers with a second gripper assembly and cutting the plurality of unidirectional ceramic fibers to separate the first planar array of ceramic fibers and the second planar array of ceramic fibers from one another.

In another aspect, the present disclosure provides for a ceramic fiber processing apparatus for the manufacture of a ceramic matrix composite (CMC) artic. The apparatus includes a frame including a plurality of unidirectional ceramic fibers wound thereabout and extending across a void therein the frame to define a first planar array of ceramic fibers and a second planar array of ceramic fibers. The apparatus further includes a first gripper assembly configured to grip the first planar array of ceramic fibers, a second gripper assembly configured to grip the second planar array of ceramic fibers and a cutting mechanism to separate the first planar array of ceramic fibers and the second planar array of ceramic fibers from one another.

In yet another aspect, the present disclosure provides for a ceramic fiber processing apparatus for the manufacture of a ceramic matrix composite (CMC) article. The apparatus includes a frame including a plurality of unidirectional ceramic fibers wound thereabout and extending across a void therein the frame to define a first planar array of ceramic fibers and a second planar array of ceramic fibers. The apparatus further includes a first gripper assembly comprising a plurality of first gripping fingers and a plurality of second gripping fingers and configured to grip the first planar array of ceramic fibers therebetween, a second gripper assembly comprising a plurality of first gripping fingers and a plurality of second gripping fingers and configured to grip the second planar array of ceramic fibers therebetween and a cutting mechanism to separate the first planar array of ceramic fibers and the second planar array of ceramic fibers from one another. Each of the plurality of first gripping fingers includes a plurality of magnets in an alternating N-S configuration and each of the plurality of second gripping fingers includes a plurality of magnets in an alternating N-S configuration.

These and other objects, features and advantages of this disclosure will become apparent from the following detailed description of the various aspects of the disclosure taken in conjunction with the accompanying drawings.

DRAWINGS

Figure 4:
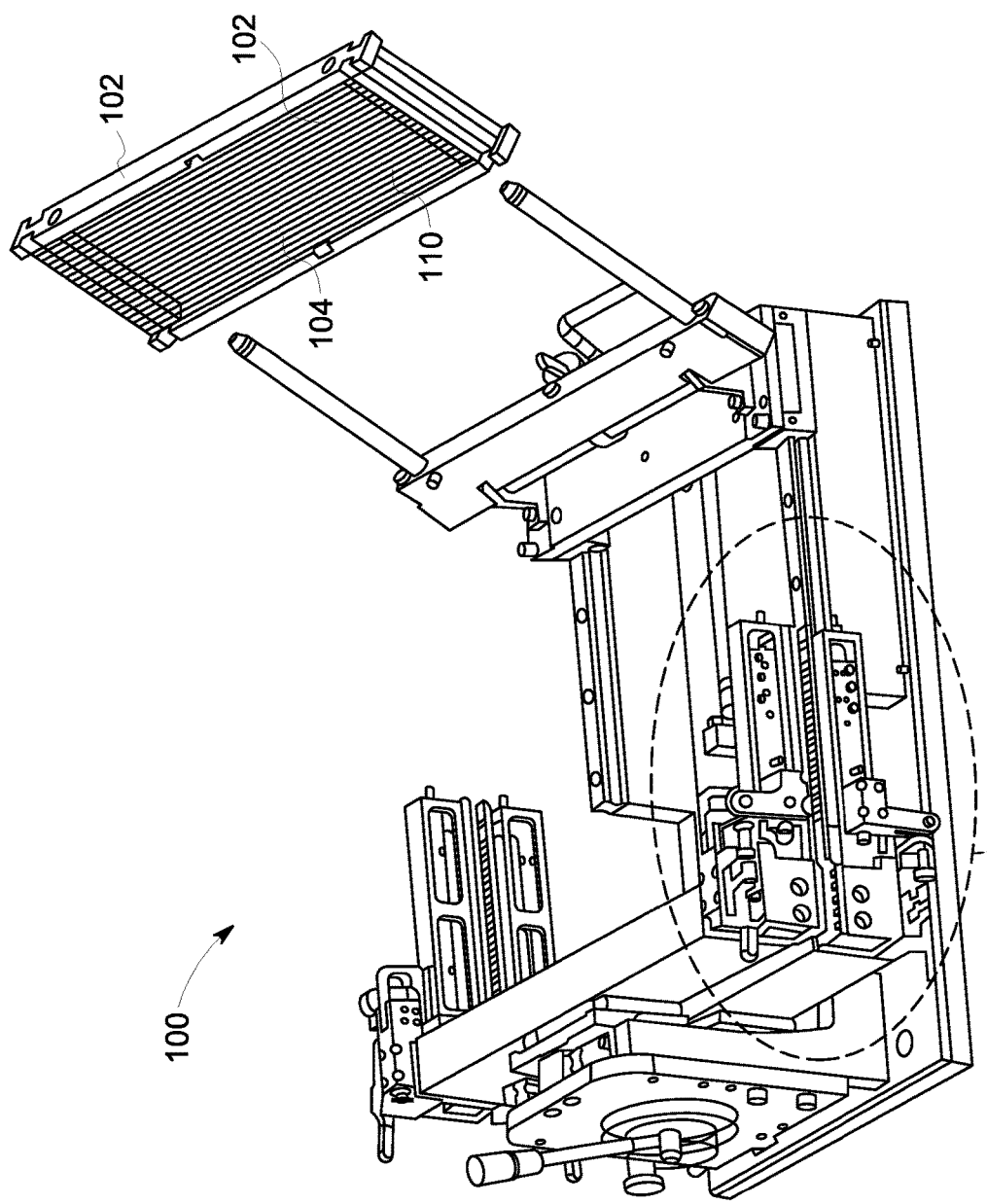
FIG. 4 is a perspective view of an apparatus for processing ceramic fiber, including a winding frame and a plurality of gripping fingers, in accordance with one or more embodiments shown or described herein.
Figure 17:
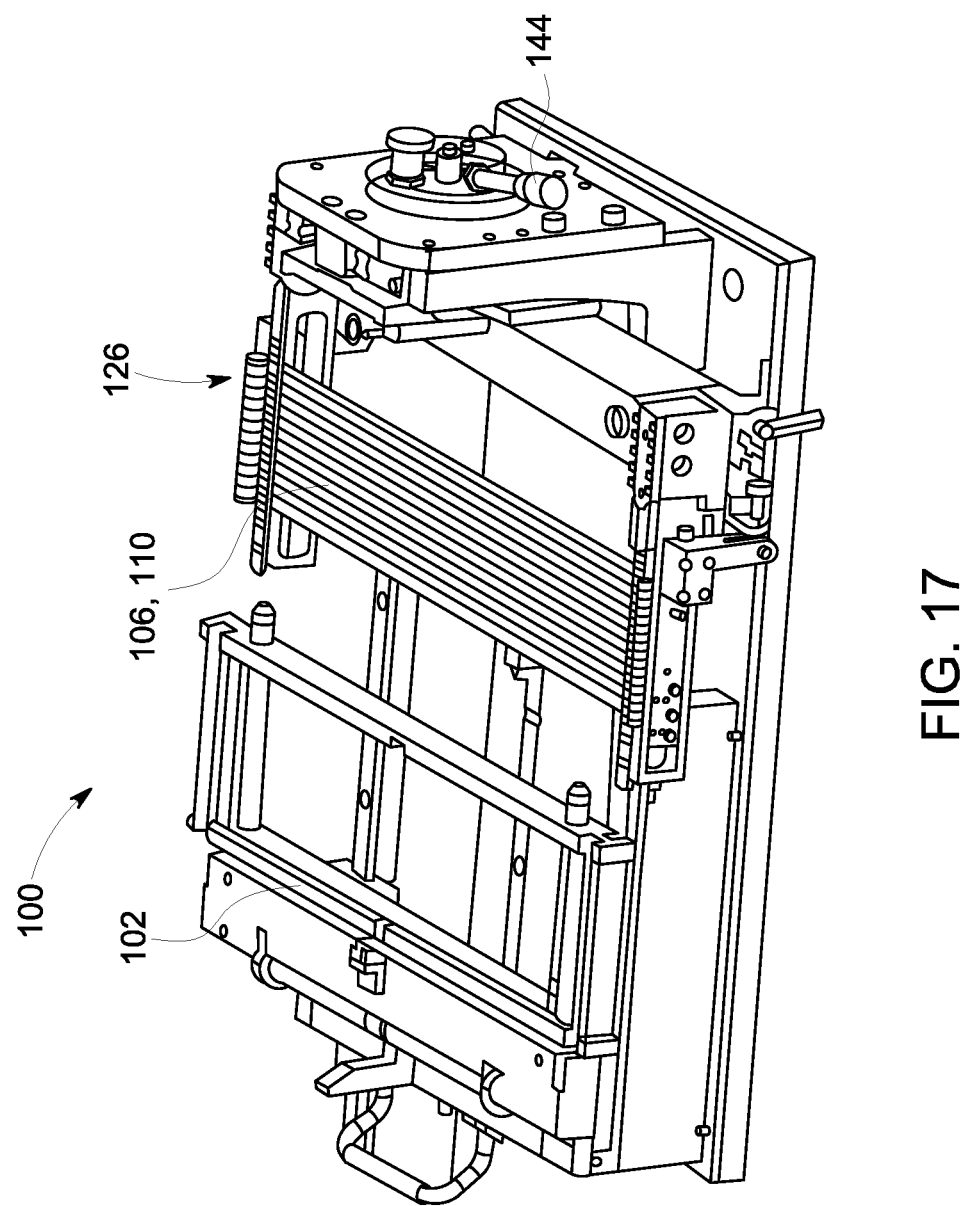
Figure 18:
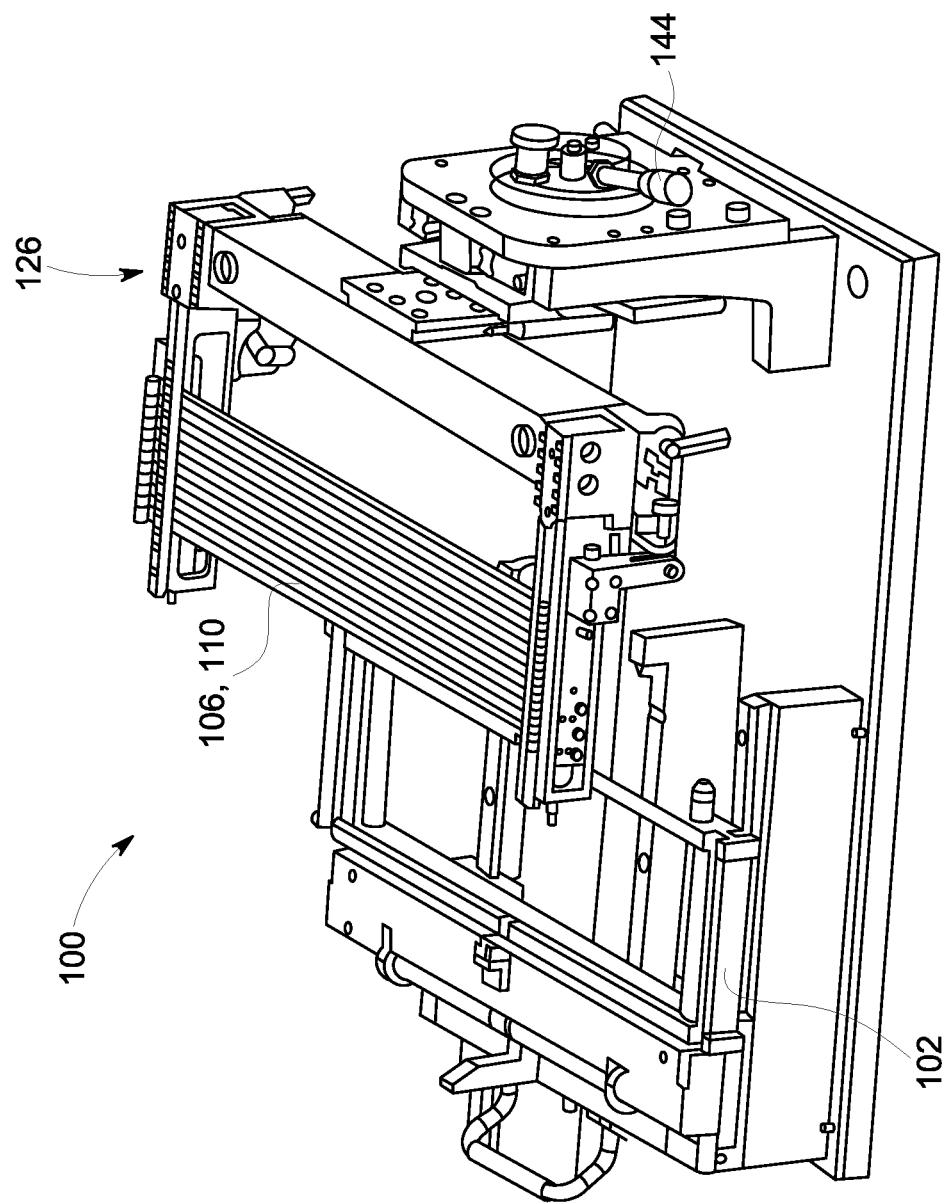

FIG. 17 is a perspective view of the apparatus for processing ceramic fiber of FIG. 4, illustrating a step in a method for processing ceramic fiber for the manufacture of a CMC article, in accordance with one or more embodiments shown or described herein; and FIG. 18 is a perspective view of the apparatus for processing ceramic fiber of FIG. 4, illustrating a step in a method for processing ceramic fiber for the manufacture of a CMC article, in accordance with one or more embodiments shown or described herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

It is noted that the drawings as presented herein are not necessarily to scale. The drawings are intended to depict only typical aspects of the disclosed embodiments, and therefore should not be considered as limiting the scope of the disclosure. Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Any examples of parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

Approximating language, as used herein throughout the specification and claims, is applied to modify any quantitative representation that could permissibly vary without resulting in a change in the basic function to which it is related. Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by such term is not to be limited to the precise value specified. In at least some instances, the approximating language may correspond to the precision of an instrument for measuring the value. Here and throughout the specification and claims, range limitations are combined and interchanged. Such ranges are identified and include all the sub-ranges contained therein unless context or language indicates otherwise.

As used herein, the term "coating" refers to a material disposed on at least a portion of an underlying surface in a continuous or discontinuous manner. Further, the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers.

FIG. 4 illustrates of an exemplary ceramic fiber processing apparatus 100 according to the present disclosure. The apparatus 100 may facilitate or provide for the processing of ceramic fiber for the manufacture of a ceramic matrix composite (CMC) article. For example, the apparatus 100 may facilitate the coating of ceramic fibers via a batch process and/or the formation of a prepreg tape (e.g., infiltration) from the coated ceramic fibers via a batch process. As shown in FIG. 4, the processing apparatus 100 may include a frame 102, as best illustrated in FIGS. 5 and 6.

Figure 5:
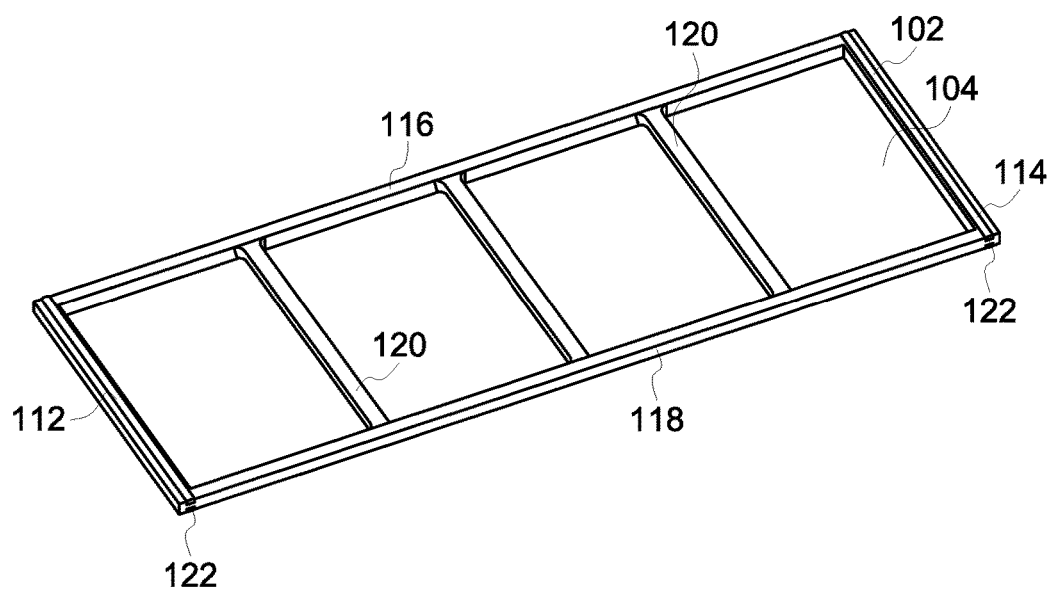
FIG. 5 is a perspective view of the winding frame of FIG. 4, in accordance with one or more embodiments shown or described herein.
Figure 6:
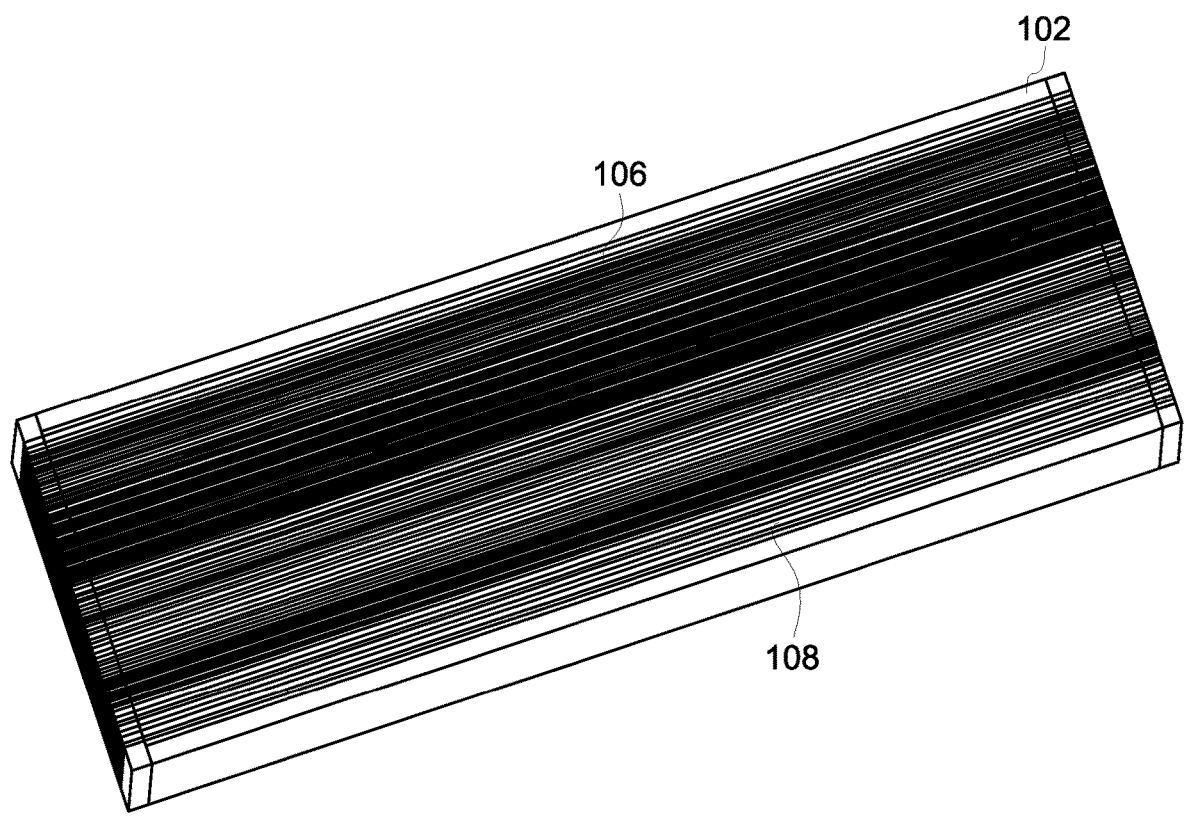
FIG. 6 is a perspective view of the winding frame of FIG. 5 having a plurality of ceramic fibers wound thereabout, in accordance with one or more embodiments shown or described herein.

Referring more particularly to FIGS. 5 and 6, the frame 102 forms a void 104, as best illustrated in FIG. 5. A plurality of ceramic fibers 106 extend across the void 104, as best illustrated in FIG. 6. Each of the plurality of ceramic fibers 106 are wrapped about the frame 102 in a manner to provide for the ceramic fibers 106 to extend across the void 104 and frame 102, so as to be positioned adjacent to the void 104. The wrapping of the ceramic fibers 106 about the frame 102 provides two planar arrays of ceramic fibers (described presently). The void 104 provides that the ceramic fibers 106 are exposed. The ceramic fibers 106 may be at least portions of individual ceramic filaments or strands, ceramic fiber tows, or a combination of individual filaments and tows. It will be appreciated that a "ceramic fiber tow" or simply a "tow," as used herein, refers to a bundle of a plurality of individual ceramic filaments or loose strands. The filaments of a tow may be randomly intermingled or arranged in a pattern, and/or may be continuous or non-continuous. For example, a tow may include broken filaments or filament segments. As another example, the filaments of a tow may be substantially parallel, twisted or otherwise arranged. A tow may act substantially in the same manner as a single or individual filament. It will also be appreciated that an "individual ceramic filament," or simply an "individual filament," as used herein, refers to a singular or non-bundled elongate ceramic member.

The ceramic fibers 106 may each extend substantially in a first direction across the void 104, such as from a first fiber support member 112 to a second fiber support member 114. In this way, the ceramic fibers 106 may be unidirectional (e.g., for the formation of a unidirectional CMC prepreg tape and/or a unidirectional CMC article, as is known in the art). The ceramic fibers 106 may include relatively minor directional variations as they extend across the void 104, but the ceramic fibers 106 may be unidirectional such that they extend substantially in the first direction and do not crossover each other. Similarly, the ceramic fibers 106 may include minor directional variations, but the ceramic fibers 106 may be unidirectional such that they extend substantially along the first direction and/or substantially parallel to one another, as a whole. If the ceramic fibers 106 include at least one tow, the at least one tow, as a whole, may be unidirectional (extend along the first direction) and/or the ceramic filaments making up the tow may be unidirectional. In some other embodiments, the ceramic filaments of a tow of the ceramic fibers 106 may extend in differing directions than the first direction (i.e., are non-unidirectional, such as twisted or woven filaments), but tow, as a whole, may extend substantially in the first direction such that the ceramic fibers 106 across the void 104 are unidirectional. In an embodiment, the frame 102 further includes pinch points (not shown) for fiber end placements.

Figure 1:
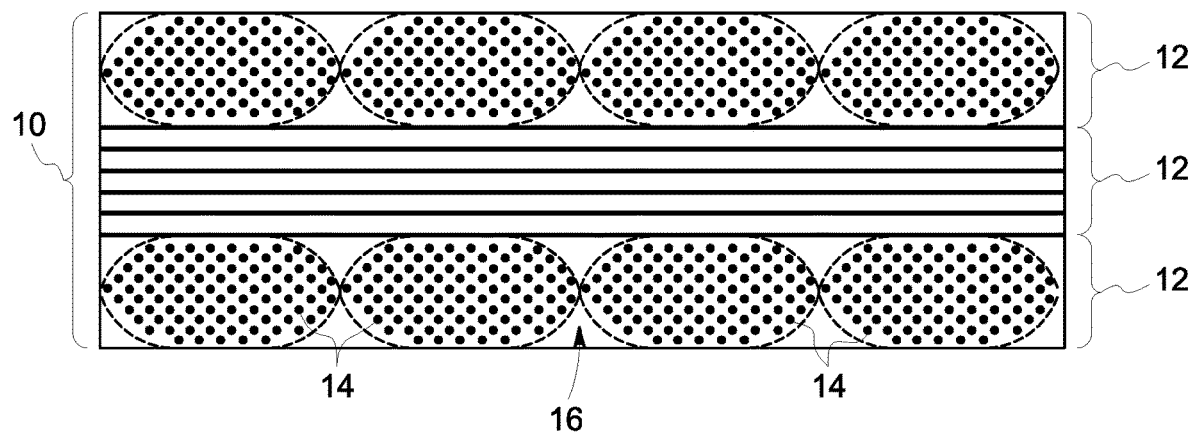
FIG. 1 is a cross-sectional view of a portion of a ceramic matrix composite (CMC) article, in accordance with known prior art.
Figure 2:
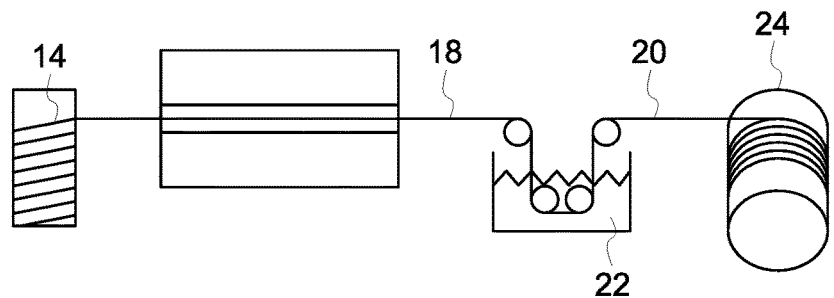
FIG. 2 illustrates a ceramic fiber coating and ceramic fiber impregnating processes, in accordance with known prior art.
Figure 3:
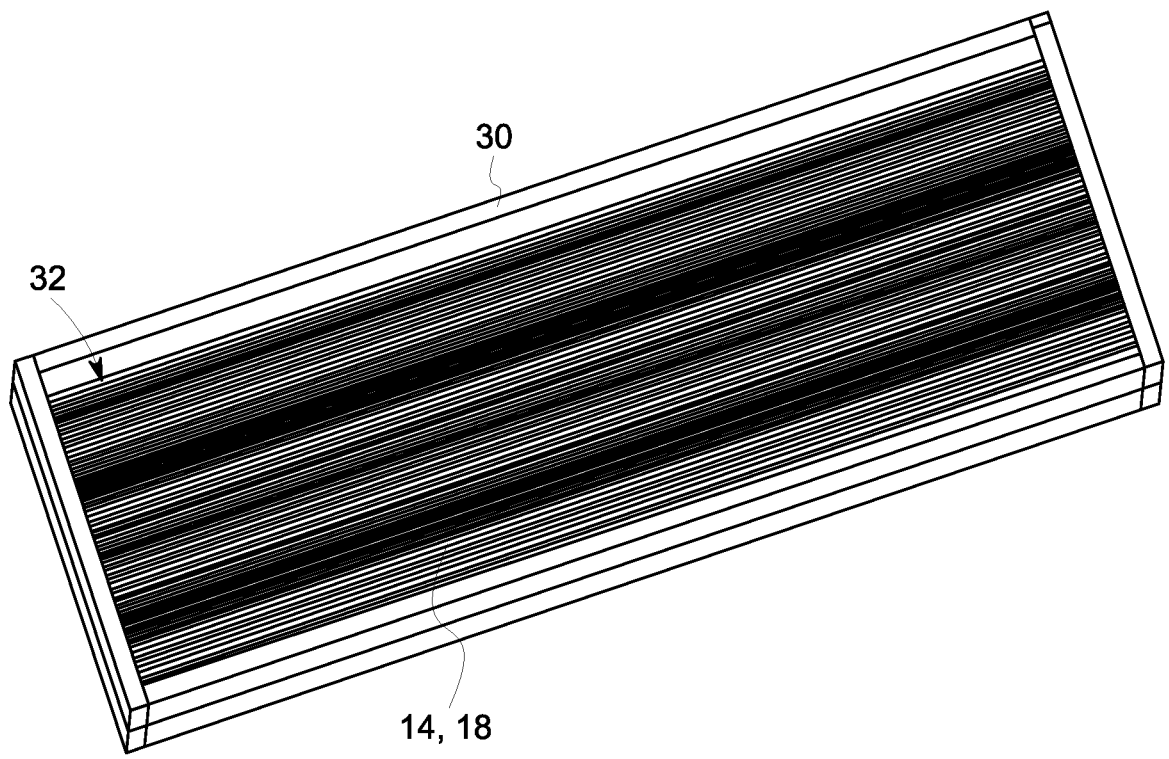
FIG. 3 illustrates a winding frame and ceramic fibers, in accordance with known prior art.

As shown in FIGS. 4 and 6, the unidirectional ceramic fibers 106 extending across the void 104 of the frame 102 form two planar arrays of ceramic fibers. For example, the unidirectional ceramic fibers 106 may be substantially arranged or positioned along a first plane across the void 104 and along a second plane across the void 104. In this way, the processing apparatus 100 may include a first substantially planar array 108 of substantially unidirectional ceramic fibers 106 extending across the void 104 of the frame 102 and a second substantially planar array 110 of substantially unidirectional ceramic fibers 106 extending across the void 104 of the frame 102. The planar arrangements of the ceramic fibers 106 may include relatively minor variations or outliers, but the ceramic fibers 106 may, as a whole, be arranged along a plane. For example, as explained further below at least one of the ceramic fibers 106 may include a plurality of individual ceramic filaments, such as a tow (as shown in FIG. 1). In some such embodiments, while the individual ceramic filaments may be off-plane (at least with respect to each other), the ceramic fibers 106, as a whole, may be substantially arranged on a plane such that the ceramic fibers 106 across the void 104 form, as a whole, the first substantially planar array 108 and the second substantially planar array 110.

The unidirectional ceramic fibers 106 forming the planar array may be spaced from each other, as a whole, as shown in FIG. 6. The spacing of the ceramic fibers 106 may be particularly configured to expose a maximum amount of the exterior surface of the fibers 106 (e.g., the filaments making a tow) to ensure formation of a coating thereon. As another example, the spacing of the ceramic fibers 106 may be particularly configured in consideration of the material of the ceramic fibers 106 for the formation of a prepreg therefrom and/or a desired performance or application of a CMC ultimately formed from the ceramic fibers 106, as explained further below. The frame 102 disclosed herein may provide for effective and consistent ceramic fiber 106 arrangement at relatively low tensions thereof, which facilitates maximum coating coverage and/or fiber arrangement during impregnation. It is noted, however, that the ceramic fibers 106 may include some minor variations in arrangement (e.g., filament breakage) that results in uneven spacing and/or abutting or intersecting of some of the fibers 106. As a whole, however, the ceramic fibers 106 may be spaced from one another. In some embodiments, the unidirectional ceramic fibers 106 (whether tows or single filaments), as a whole, may be substantially evenly spaced throughout each planar array, or the spacing may vary. If the ceramic fiber portions 30 are tows, the frame 102 may be configured such that the ceramic filaments making up each tow are spaced from each other. In such embodiments, the spacing of adjacent tows (i.e., the spacing between adjacent ceramic filaments of adjacent tows) may be spaced about the same distance as the spacing of the individual filaments of the tows. In some embodiments, the ceramic fibers 106 may be positioned and spaced from each other such that the density and arrangement of filaments thereof is substantially uniform throughout the width and/or length and/or thickness of the planar array.

The unidirectional ceramic fibers 106 of the first substantially planar array 108 and the second substantially planar array 110 may be any ceramic material suitable for the manufacture of CMC prepregs and, ultimately, CMC articles. For example, the ceramic fibers 106 may be primarily carbon (C), silicon carbide (SiC), alumina (Al2O3) and/or mullite (Al2O3—SiO2) based fibers. The ceramic fibers 106 may contain other elements and/or impurities in addition to the base or primary material, such as C, O, N, Ti, Zr, B, for example. In some embodiments, the apparatus 32 may be particularly advantageous for coating silicon carbide fibers (i.e., pure SiC fibers or primarily SiC based fibers) and/or forming a prepreg with such coated silicon carbide fibers. In such embodiments, the first substantially planar array 108 and the second substantially planar array 110 may include unidirectional silicon carbide ceramic fibers 106.

The frame 102 may be of any design, configuration or mechanism that forms a space or void 104, supports the first substantially planar array 108 and the second substantially planar array 110 of unidirectional ceramic fibers 106 across the void 104, and provides for gripping by the gripping fingers of the apparatus 100, described presently. In an embodiment, the frame 102 is comprised of aluminum and may include storage chambers for pressurized air to operate one or more pneumatic solenoids in an automated version. The void 104 may be of any size or shape for any corresponding size or shape planar arrays. The void 104 may be an unobstructed area.

As noted above, the frame 102 may be of any configuration to form the void 104, enable winding of the ceramic fibers 106 thereabout, and provide support to the first substantially planar array 108 and the second substantially planar array 110 across the void 104, and provide for gripping by the gripping fingers of the apparatus 100. One example of a configuration of the frame 102 is shown in FIG. 5. As shown in FIG. 5, the frame 102 may include the first fiber support member 112 and the second fiber support member 114. The frame 102 may additionally include a first spacing member 116 and a second spacing member 118 that extend between the first and second fiber support members 112, 114. The void 104 of the frame 102 may extend between the first fiber support member 112 and the second fiber support member 44, as shown in FIG. 5. The void 104 of the frame 102 may also extend between the first spacing member 116 and a second spacing member 118. The first and second fiber support members 112, 114 and the first and second spacing members 116, 118 are orientated at substantially right angles with respect to each other such that the frame 102 (and, potentially, the void 104) is a rectangular or square shape. The first and second fiber support members 1112, 114 may act to rigidly affix and space the first and second spacing members 116, 118.

In some embodiments, the frame 102 may include a tensioning mechanism that is configured to adjust the tension of the ceramic fibers 106. In an embodiment, as best illustrated in FIG. 5, the frame 102 may include one or more tensioning members 120 that extend between the first spacing member 116 and a second spacing member 118. The tensioning mechanism may be effective to apply a tension to the ceramic fibers 106 after the ceramic fibers 106 are wound about the frame 102 to form (and maintain) the unidirectional, planar array configurations of the ceramic fibers 106. The tension needed to form and/or maintain the first substantially planar array 108 and the second substantially planar array 110 and unidirectional direction of the ceramic fibers 106 may vary depending upon the particular fiber composition, for example.

The frame 102 is further comprised of a plurality of locating holes 122 for locating the frame 102 in a winding station and the processing apparatus 100.

The frame 102 example shown in FIG. 6 is formed by a wrapping or winding technique. The ceramic fibers 106 may be wrapped about the first and second fiber support members 112, 114 such that each of the first substantially planar array 108 and the second substantially planar array 110 extends there between across the void 104. For example, one or more ceramic fibers may be wrapped or wound a plurality of times over the first and second fiber support members 112, 114 to form the first substantially planar array 108 and the second substantially planar array 110 of unidirectional fibers 106. In this way, the first substantially planar array 108 may be formed proximate to a top surface of the frame 102 and the second substantially planar array 110 may be formed proximate to a bottom surface of frame 102.

Figure 7:
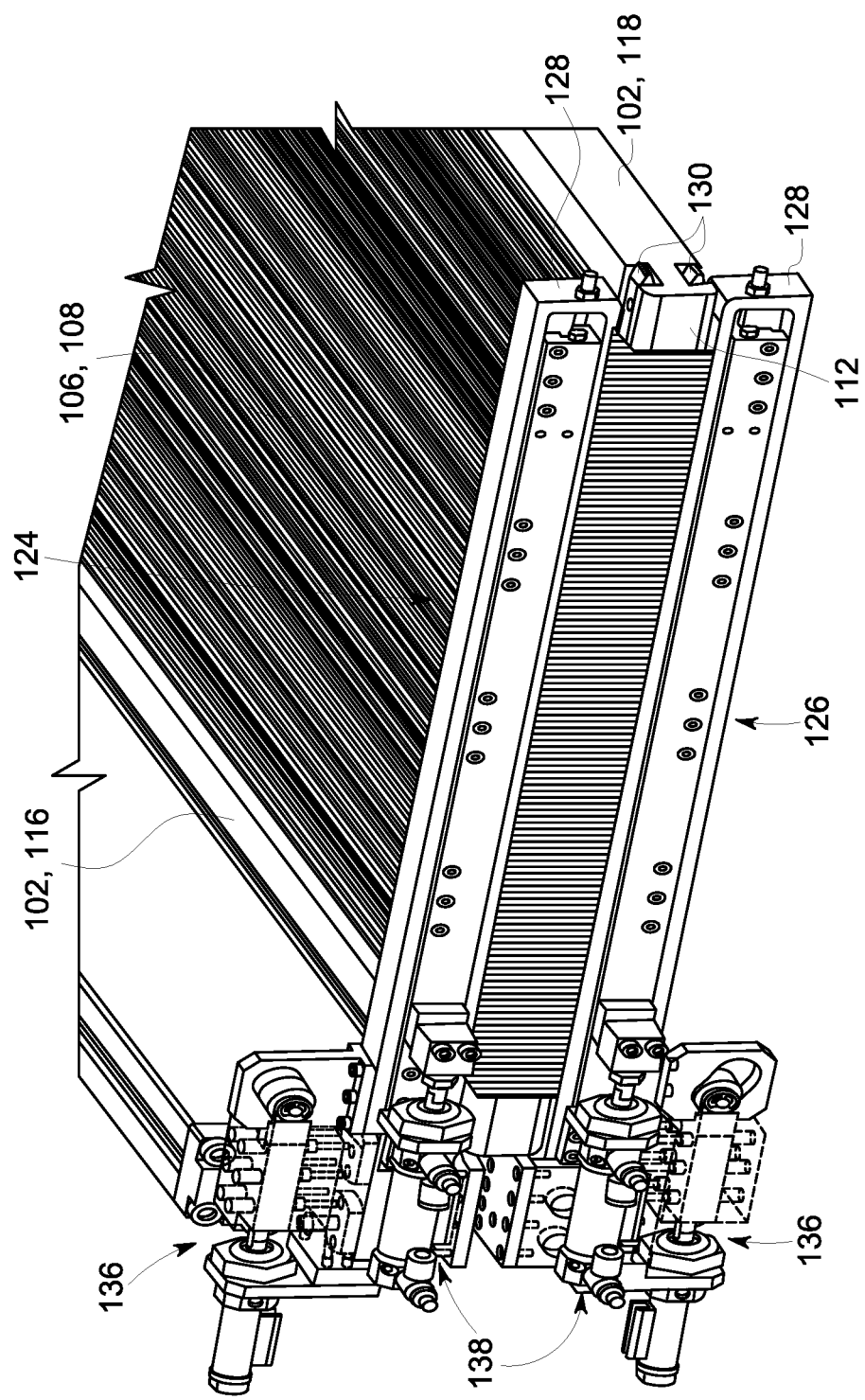
FIG. 7 is a close-up perspective view of a portion of the apparatus for processing ceramic fiber of FIG. 4, in accordance with one or more embodiments shown or described herein.
Figure 8:
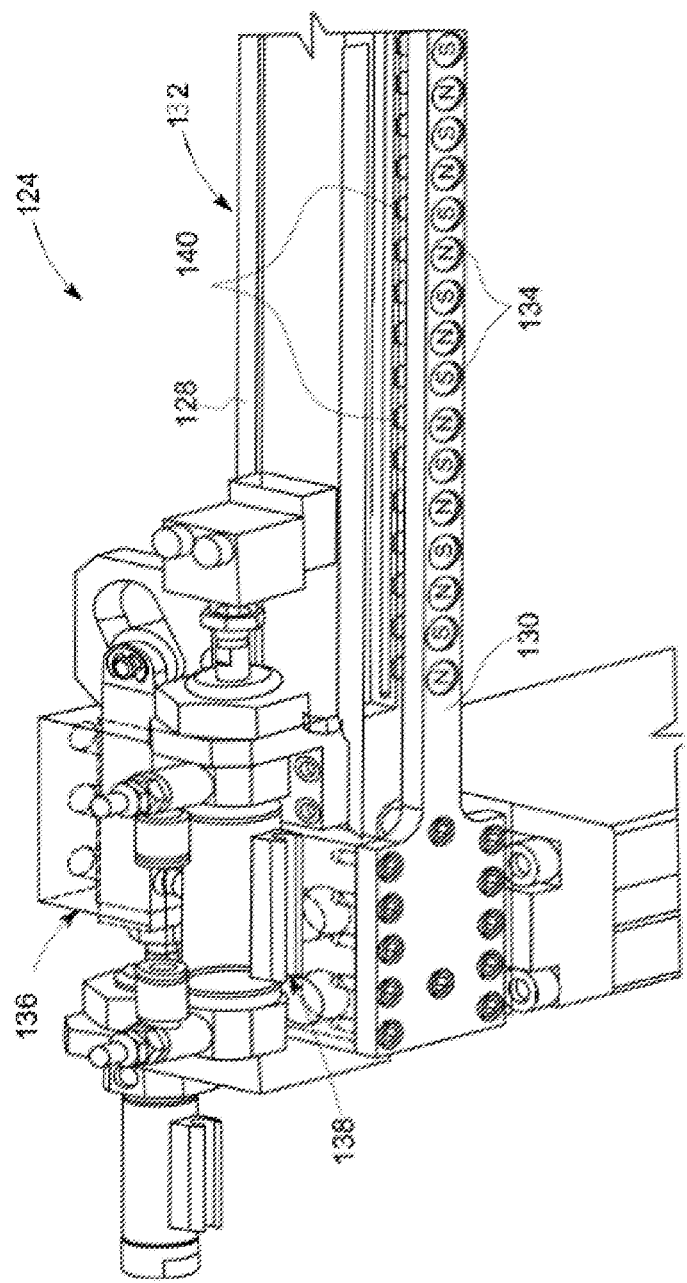
FIG. 8 is a close-up perspective view of a portion of one of the plurality of gripping fingers of the apparatus for processing ceramic fiber of FIG. 4, in accordance with one or more embodiments shown or described herein.

Referring now to FIGS. 7 and 8, illustrated is a portion of the processing apparatus 100, as best illustrated in FIG. 4. More particularly, illustrated are a plurality of fiber grippers having disposed therein the frame 102 of FIG. 6, including the plurality of ceramic fibers 106 wrapped thereabout. As illustrated, the processing apparatus 100 includes a first fiber gripper assembly 124 and a second fiber gripper assembly 126. Each of the first and second fiber gripper assemblies 124, 126 is comprised of a plurality of first gripping fingers 128 and a plurality of second gripping fingers 130 (of which only one is shown in FIGS. 7 and 8 for each of the first fiber gripper assembly 124 and a second fiber gripper assembly 126). The plurality of first gripping fingers 128 are configured movable relative to a respective one of the plurality of second gripping fingers 130. In an embodiment, each of the plurality of first gripping fingers 128 and the plurality of second gripping fingers 130 are formed of stainless steel. As best illustrated in FIG. 8, each of the plurality of first gripping fingers 128 includes a plurality of magnets 132 in alternating N-S configuration. Each of the plurality of second gripping fingers 130 includes a plurality of magnets 134 in alternating N-S configuration. In an embodiment, each of the first gripping fingers 128 includes thirty-eight (38) magnets in alternating N-S configuration. In an embodiment, each of the second gripping fingers 130 includes thirty-nine (39) magnets in alternating N-S configuration. It should be understood, that the number of magnets is design specific, and not intended to be limiting. In an embodiment, at least one of the first and second gripping fingers 128, 130 may include SAE 1018 plugs 140 to transfer magnetic forces between the first plurality of magnets 132 and the second plurality of magnets 134. During operation of the processing apparatus 100, by changing the magnet position of the plurality of magnets 132 of each of the first gripping finger 128 in relation to the plurality of magnets 134 of a respective one of the second gripping finger 130, a force of the magnets provides movement of respective first and second gripping fingers 128, 130 relative to one another that translates into a grip force in a first condition and a grip release force in a second condition. More specifically, as an example, the first gripping fingers 128 are in "pull" position when the fibers are clamped, thus enabling an equal gripping force along a full width of the first and second substantially planar arrays 108, 110. The first gripping fingers 128 are in "push" position when fibers are unclamped.

Figure 9:
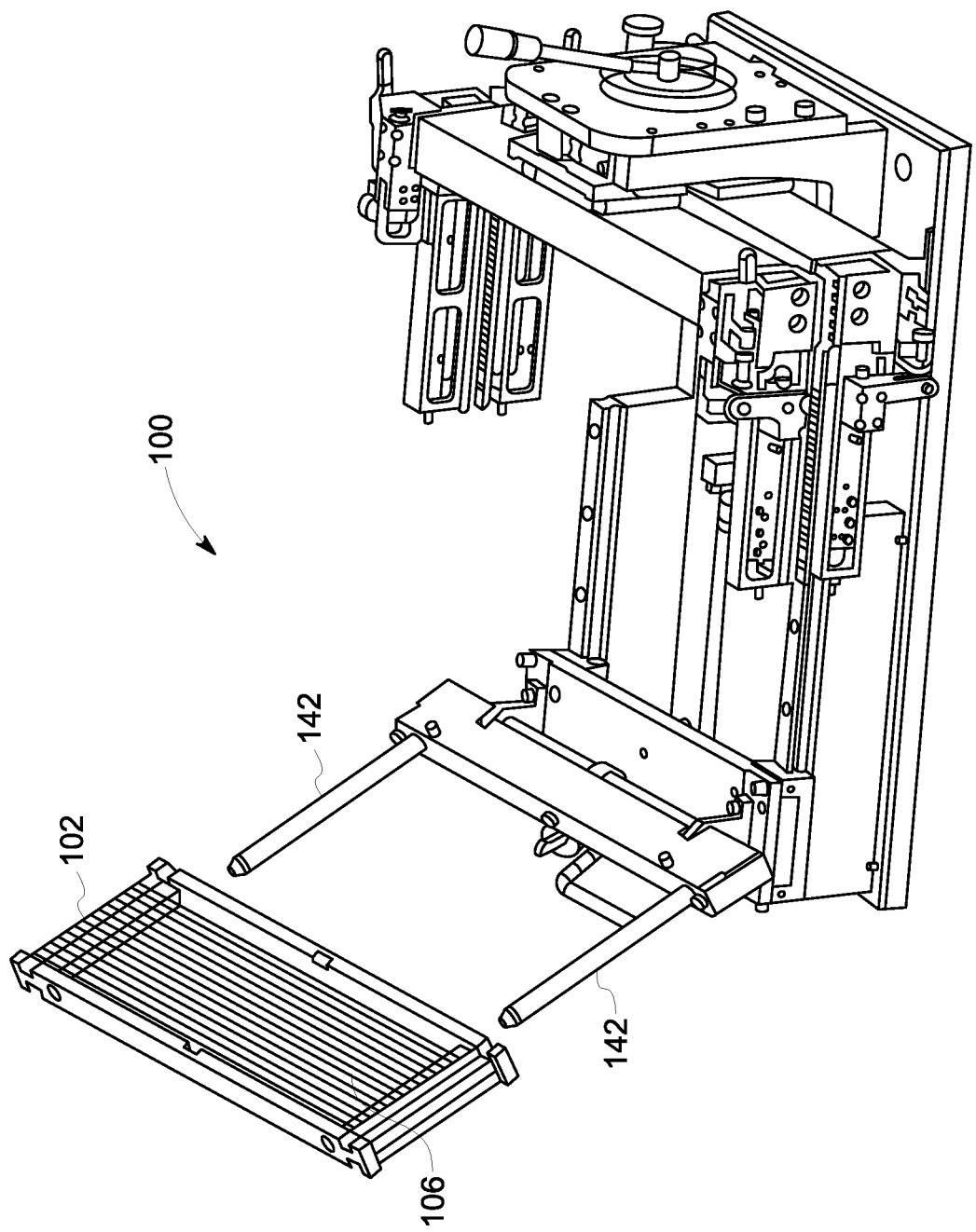
FIG. 9 is a perspective view of the apparatus for processing ceramic fiber of FIG. 4, illustrating a step in a method for processing ceramic fiber for the manufacture of a CMC article, in accordance with one or more embodiments shown or described herein.
Figure 10:
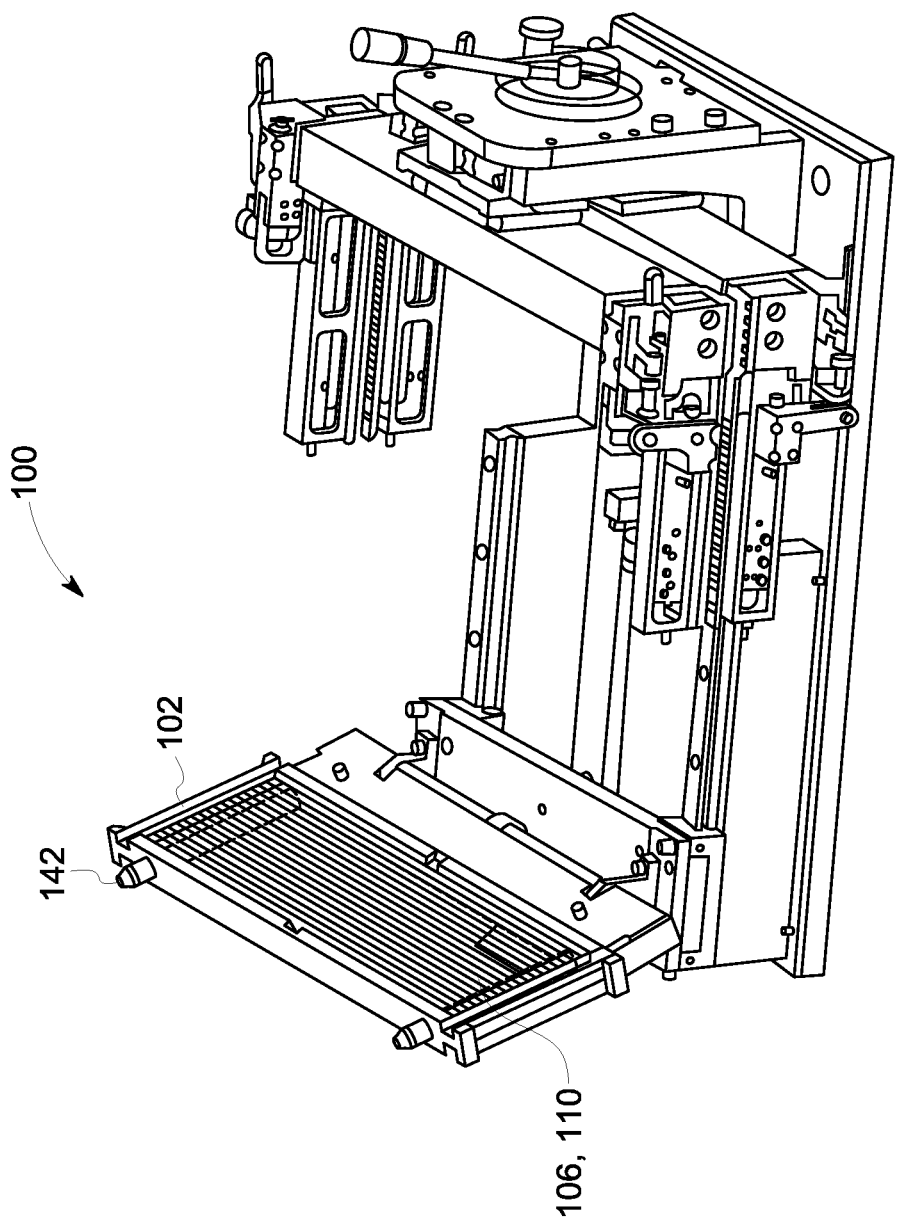
FIG. 10 is a perspective view of the apparatus for processing ceramic fiber of FIG. 4, illustrating a step in a method for processing ceramic fiber for the manufacture of a CMC article, in accordance with one or more embodiments shown or described herein.
Figure 11:
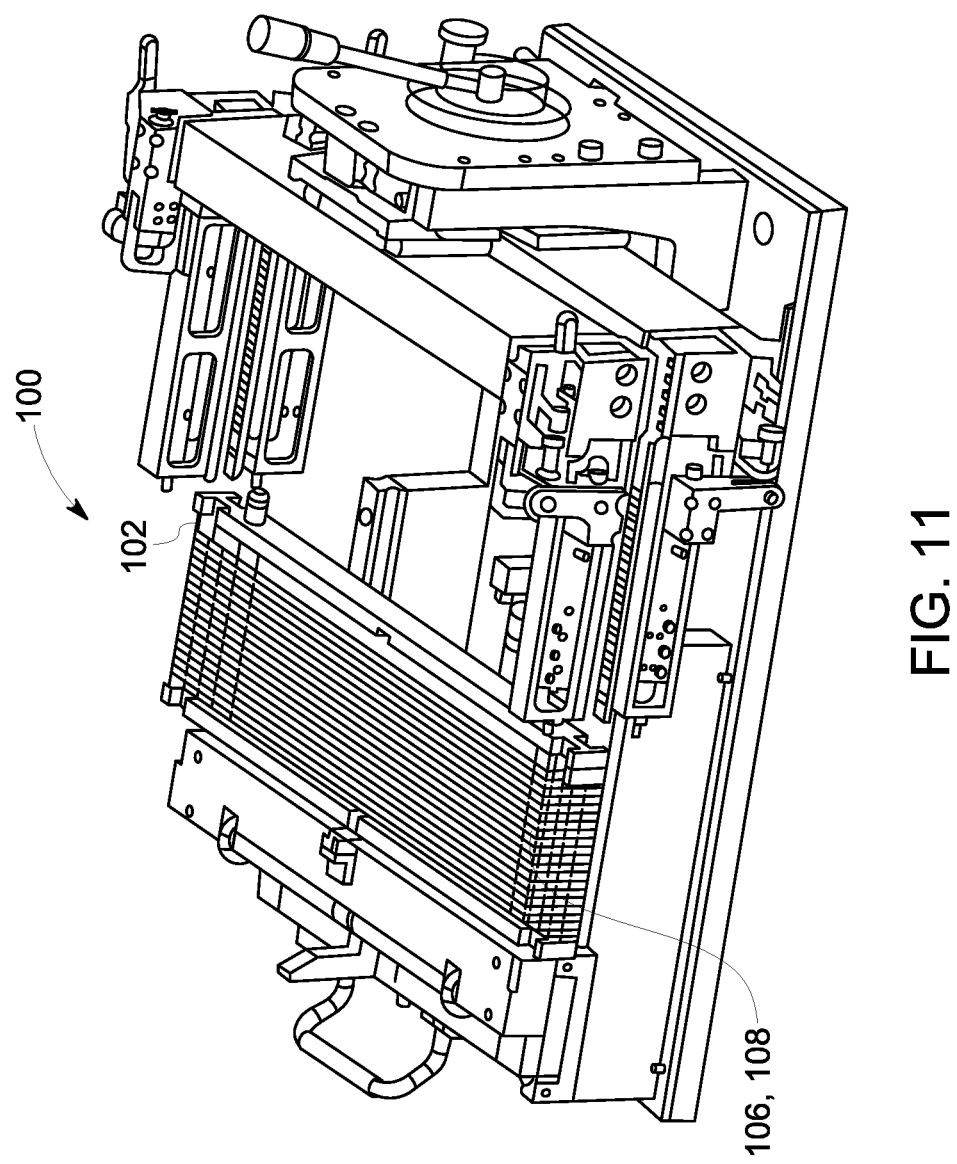
FIG. 11 is a perspective view of the apparatus for processing ceramic fiber of FIG. 4, illustrating a step in a method for processing ceramic fiber for the manufacture of a CMC article, in accordance with one or more embodiments shown or described herein.

Referring now to FIGS. 9-18, illustrated are steps in a method of processing ceramic fibers 106 utilizing the processing apparatus 100 disclosed herein. Referring more specifically to FIGS. 9 and 10, during a first step, the frame 102 having the ceramic fibers 106 wound thereabout, is positioned against a plurality of shafts 142. The frame 102 is positioned relative to the shafts 142 using the locating holes 122 formed in the frame 102. In an embodiment, a locking mechanism is used to keep the frame 102 in place relative to the shafts 142. Subsequent to positioning of the frame 102 on the shafts 142, the frame 102 is rotated to horizontal (nesting) position. A torsion spring (not shown) prevents the frame 102 from free fall during rotation to the nesting position, as best illustrated in FIG. 11. Subsequent to rotation of the frame 102 to the nesting position, the tensioning members 120 (FIG. 4) are removed.

Figure 12:
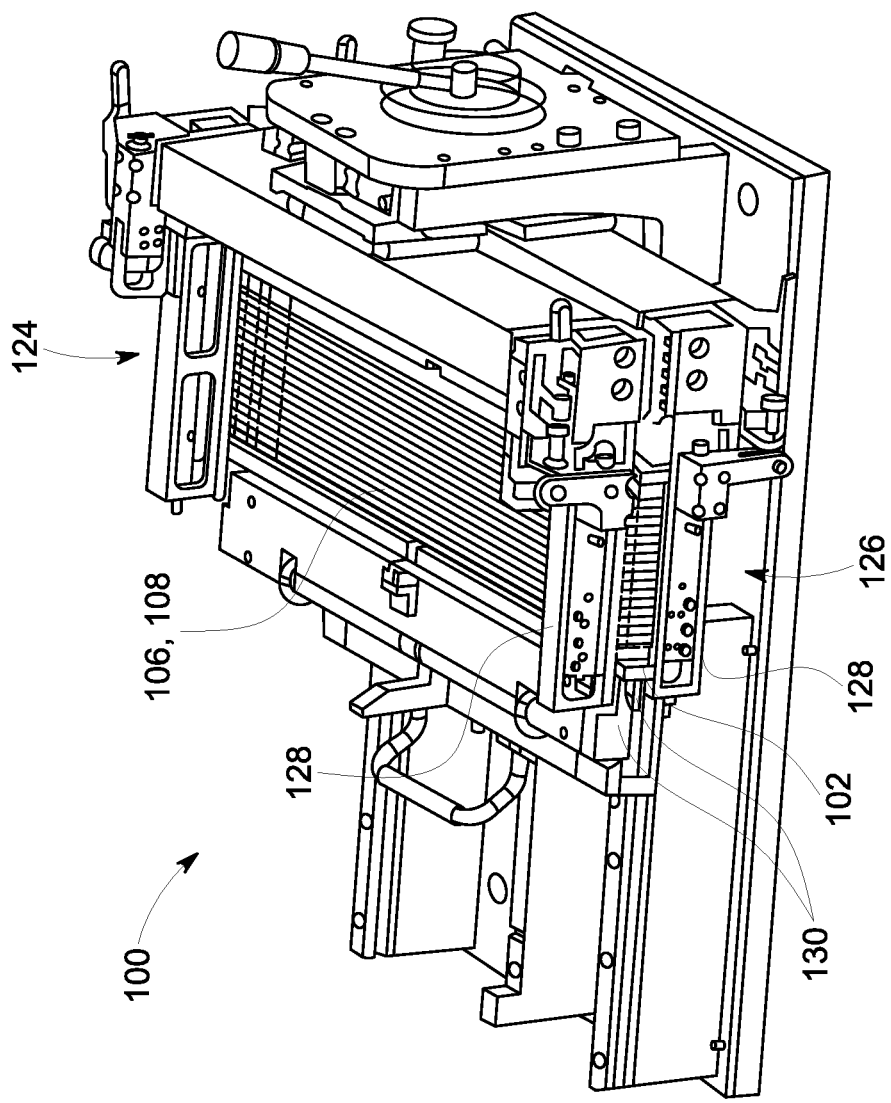
FIG. 12 is a perspective view of the apparatus for processing ceramic fiber of FIG. 4, illustrating a step in a method for processing ceramic fiber for the manufacture of a CMC article, in accordance with one or more embodiments shown or described herein.

The frame 102 next slides into a fiber split position, as best illustrated in FIG. 12. More particularly, the frame 102 slides into a position relative to the first fiber gripper assembly 124 and the second fiber gripper assembly 126. More specifically, to provide for fiber splitting, portions of the ceramic fibers 106 proximate the first and second fiber support members 112, 114 of the first substantially planar array 108 of ceramic fibers 106 are positioned between the first gripping fingers 128 and the second gripping fingers 130 of the first fiber gripper assembly 124. Similarly, the second substantially planar array 110 of ceramic fibers 106 is positioned between the first gripping fingers 128 and the second gripping fingers 130 of the second fiber gripper assembly 126. In an embodiment, to achieve positioning of the first fiber gripper assembly 124 and the second fiber gripper assembly 126, the frame 102 slides in a manner to allow for the second gripping fingers 130 of each of the gripper assemblies 124, 126 to enter a space defined between the frame 102 and the plurality of ceramic fibers 106, leaving a clearance between the fibers 106 and the first and second gripping fingers 128, 130.

Figure 13:
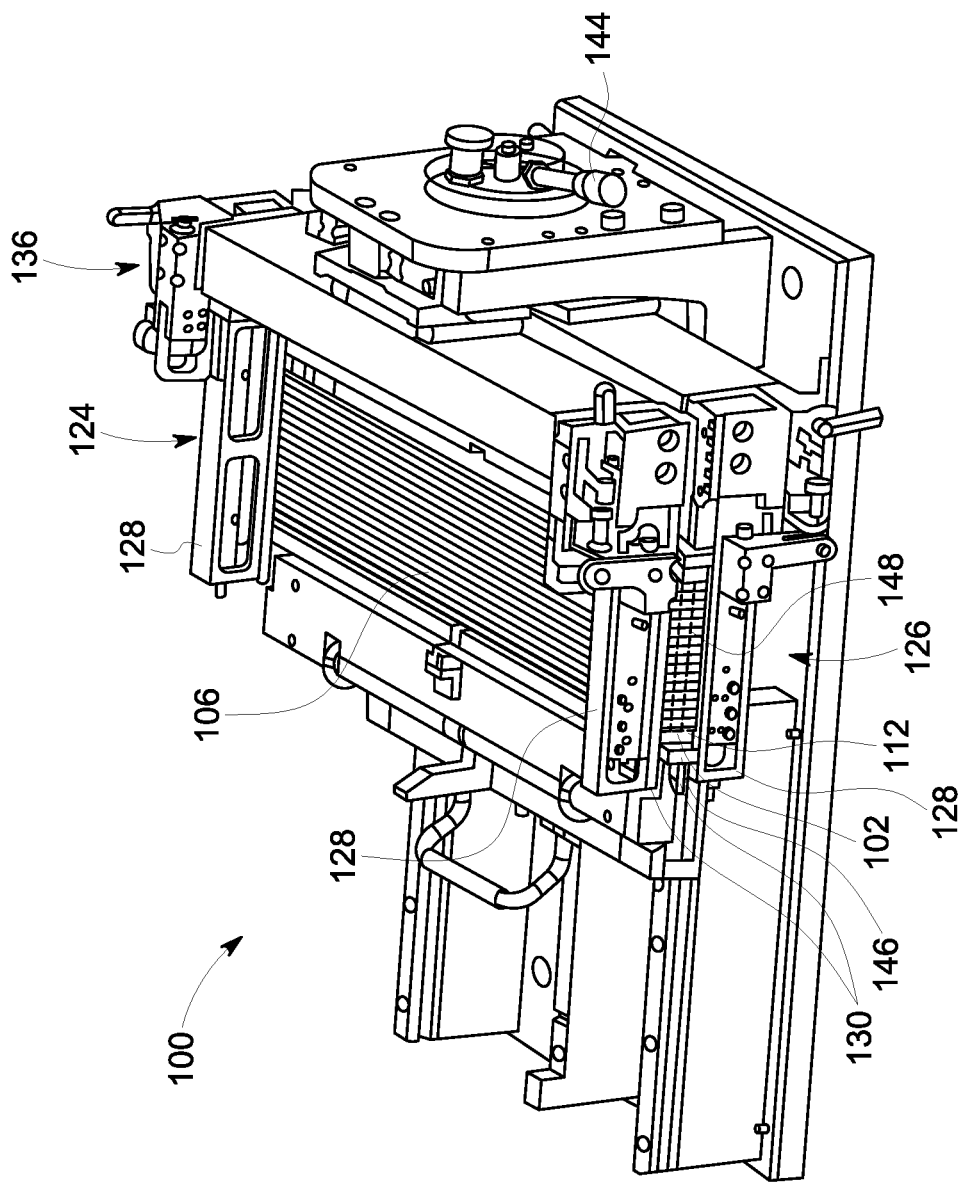
FIG. 13 is a perspective view of the apparatus for processing ceramic fiber of FIG. 4, illustrating a step in a method for processing ceramic fiber for the manufacture of a CMC article, in accordance with one or more embodiments shown or described herein.

Referring now to FIG. 13, a clamping cylinder mechanism 136 is actuated, such as by movement of a handle 144, so as to actuate movement of the first gripping fingers 128 and the second gripping fingers 130 relative to the fibers 106 of each substantially planar array 108, 110. The movement of the first gripping fingers 128 results in clamping of the first gripping fingers 128 to the second gripping fingers 130. Next, a slide cylinder mechanisms 138 places the plurality of magnets 132 of the first gripping fingers 128 in a pull position, so as to align N-S with the plurality of magnets 134 of the respective second gripping finger 130 causing the ceramic fibers 106 to be clamped evenly across the first and second fiber grippers 124, 126. The N-S alignment of the plurality of magnets 132 of the first gripping fingers 128 with the plurality of magnets 134 of the respective second gripping finger 130 enables an equal gripping force along a full width of the first and second substantially planar arrays 108, 110.

The first gripper assembly 124 and the second gripper assembly 126 provide for the securing of each of the first and second substantially planar arrays 108, 110 within a grip exerting a uniform clamping force in addition to providing a means to transfer the first and second substantially planar arrays 108, 110 of ceramic fibers 106 from the coating frame 102 to a pre-preg station in order to produce a CMC tape.

Next, the first substantially planar array of ceramic fibers 108 and the second substantially planar array of ceramic fibers 110 are separated or split, one from another, by cutting with a cutting mechanism 146, the ceramic fibers 106 proximate the first and second fiber support members 112, 114 (FIG. 5) of the frame 102, as best illustrated at 148, of which only one cut line is illustrated proximate the first fiber support member 112.

Figure 14:
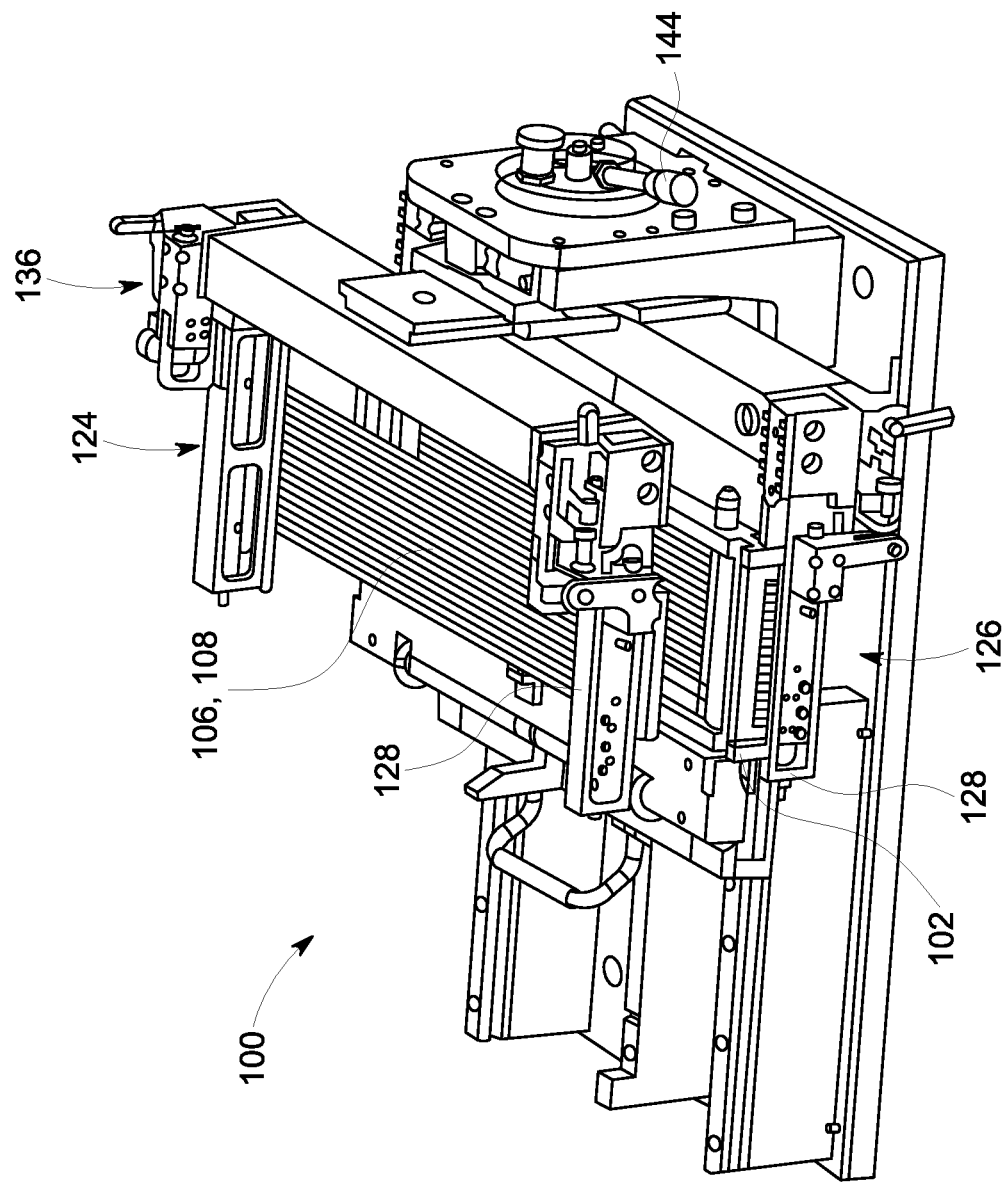
FIG. 14 is a perspective view of the apparatus for processing ceramic fiber of FIG. 4, illustrating a step in a method for processing ceramic fiber for the manufacture of a CMC article, in accordance with one or more embodiments shown or described herein.

Referring now to FIG. 14, subsequent to cutting the first substantially planar array of ceramic fibers 108 and the second substantially planar array of ceramic fibers so as to separate, one from another, the first fiber gripper assembly 124 is actuated, such as by rotating handle 144, to cause the first fiber gripper assembly 124 to separate the first substantially planar array of ceramic fibers 108 from the frame 102 a distance.

Figure 15:
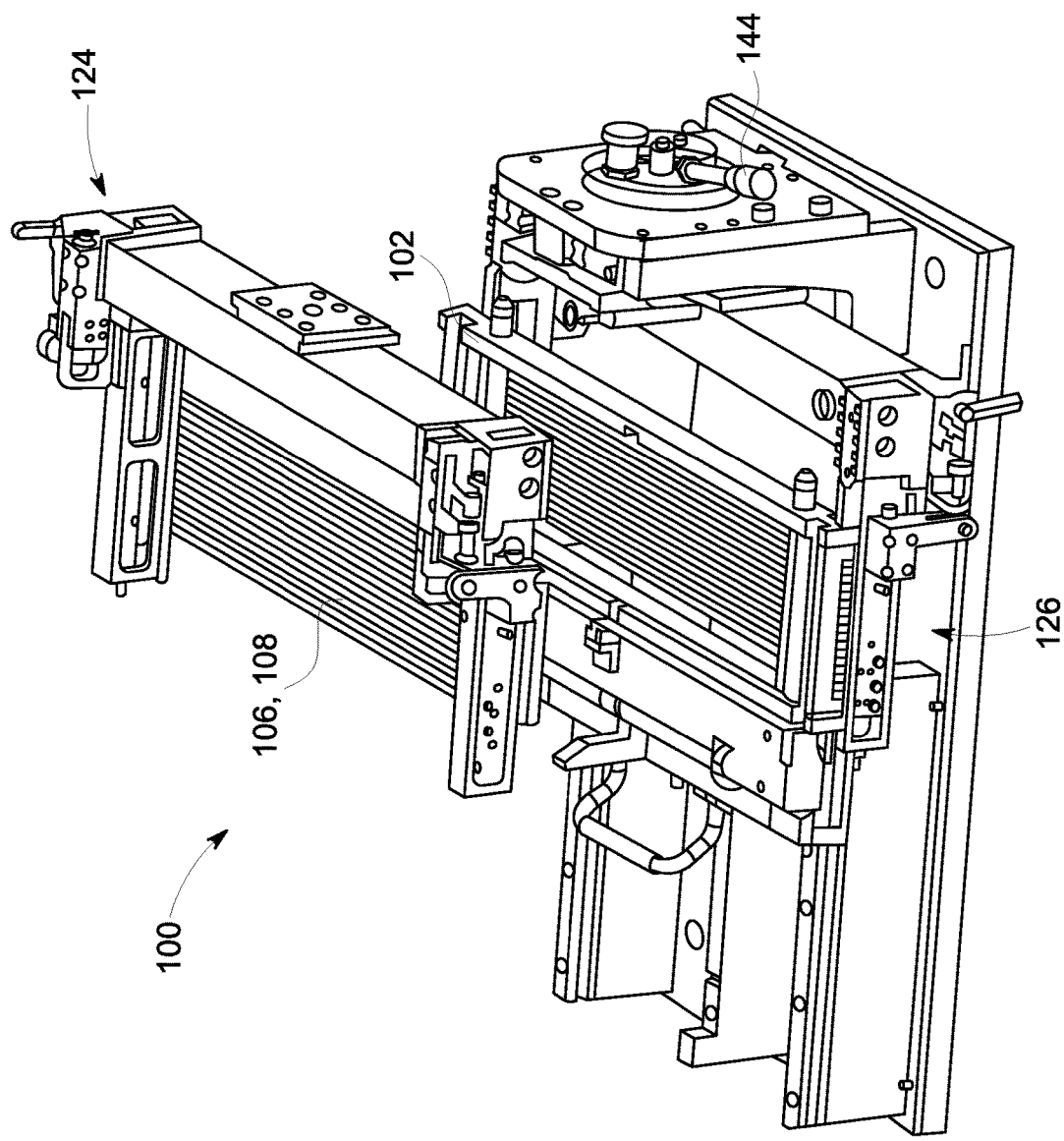
FIG. 15 is a perspective view of the apparatus for processing ceramic fiber of FIG. 4, illustrating a step in a method for processing ceramic fiber for the manufacture of a CMC article, in accordance with one or more embodiments shown or described herein.
Figure 16:
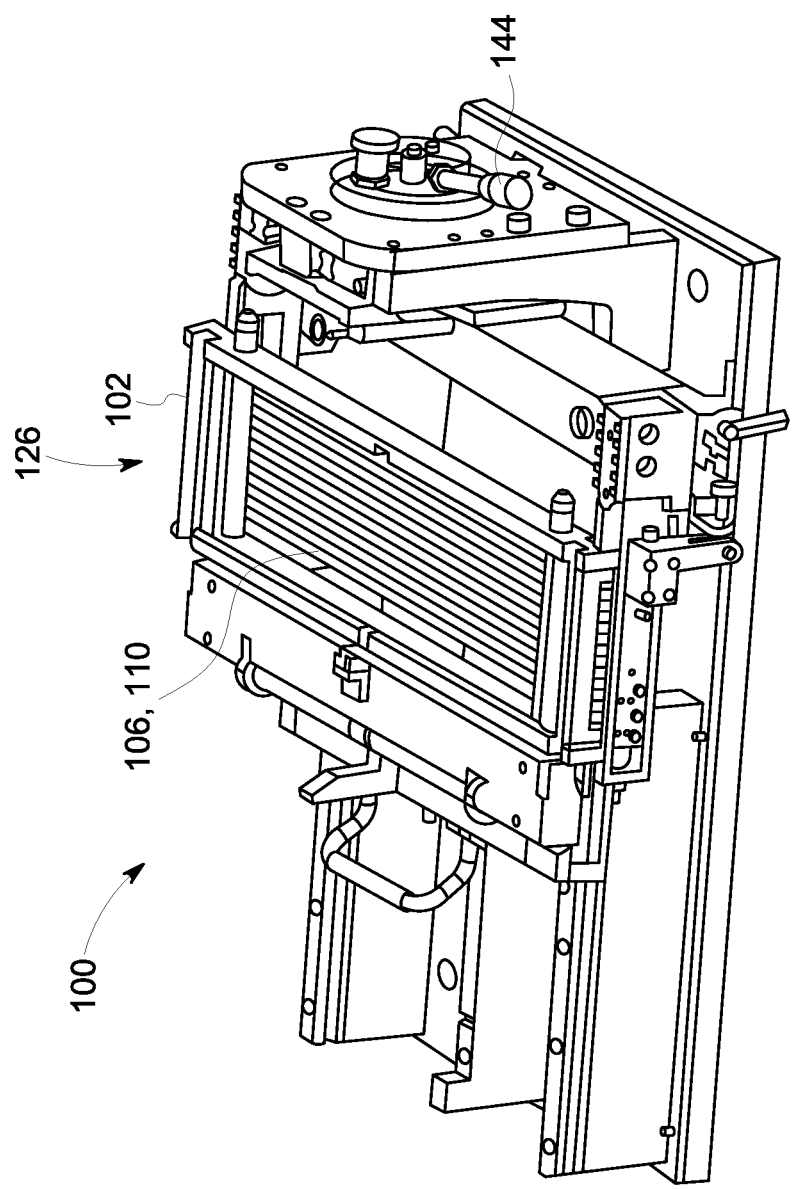
FIG. 16 is a perspective view of the apparatus for processing ceramic fiber of FIG. 4, illustrating a step in a method for processing ceramic fiber for the manufacture of a CMC article, in accordance with one or more embodiments shown or described herein.

Next, as best illustrated in FIG. 15, the first gripper assembly 124 is removed from the ceramic fiber processing apparatus 100 for further processing, such as moved to a slurry station (not shown). Subsequent to removal of the first gripper assembly 124, the frame 102 is illustrated in FIG. 16, positioned relative to the remaining second gripper assembly 126 and second substantially planar array of ceramic fibers 110.

To prepare for removal of the second gripper assembly 126 and the second substantially planar array of ceramic fibers 110, the frame 102 is caused to move back to a starting position, as best illustrated in FIG. 17. With the frame 102 moved back to the start position, and away from the second gripper assembly 126, the second gripper assembly 126, having the second substantially planar array of ceramic fibers 110 retained between the first and second gripping fingers 128, 130, is removed for further processing, such as moved to a slurry station (not shown).

Accordingly, disclosed is a ceramic fiber processing apparatus that facilitates forming a prepreg tape. The apparatus provides for the gripping of flexible materials, such as fabrics or fiber bands, which may come in different sizes (e.g., 5"×12", 15"×50", or any other sizes). The flexible materials typically go through additional processing steps that require clamping of the materials with an equal gripping force along full dimension of the flexible material. As disclosed herein, the placement of magnets along the gripping fingers provides equal force along the length of the gripper. In addition, the gripping fingers as disclosed herein may include any number of magnets, or the ability to change the number of magnets, so as to change the gripping force of the gripper assembly. Furthermore, the gripper assemblies as disclosed herein may operate as a fully automated system or a manual system.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of processing a plurality of ceramic fibers in a ceramic fiber processing apparatus for the manufacture of a ceramic matrix composite (CMC) article, comprising:
   providing a frame including a plurality of unidirectional ceramic fibers disposed thereabout and extending across a void therein the frame to define a first planar array of ceramic fibers and a second planar array of ceramic fibers;
   disposing the frame in the ceramic fiber processing apparatus;
   gripping the first planar array of ceramic fibers with a first gripper assembly and gripping the second planar array of ceramic fibers with a second gripper assembly;
   cutting the plurality of unidirectional ceramic fibers to separate the first planar array of ceramic fibers and the second planar array of ceramic fibers from one another.

2. The method of claim 1, wherein providing the frame includes winding the plurality of unidirectional ceramic fibers about the frame to define the first planar array of ceramic fibers and the second planar array of ceramic fibers.

3. The method of claim 1, wherein the first gripper assembly comprises a plurality of first gripping fingers and a plurality of second gripping fingers and wherein the second gripper assembly comprises a plurality of first gripping fingers and a plurality of second gripping fingers.

4. The method of claim 3, wherein each of the plurality of first gripping fingers of the first gripper assembly and the second gripper assembly includes a plurality of magnets in an alternating N-S configuration and each of the plurality of second gripping fingers includes a plurality of magnets in an alternating N-S configuration.

5. The method of claim 4, wherein the step of gripping the first planar array of ceramic fibers with the first gripper assembly and gripping the second planar array of ceramic fibers with the second gripper assembly further comprises moving each of the plurality of first gripping fingers relative to a respective one of the second gripping fingers of the plurality of second gripping fingers.

6. The method of claim 5, wherein the step of moving comprises actuating one or more clamping cylinder mechanisms to clamp each of the first gripping fingers relative to a respective second gripping finger of the plurality of second gripping fingers.

7. The method of claim 6, wherein the step of moving further comprises actuating one or more sliding cylinder mechanisms to slidingly move each of the first gripping fingers relative to a respective second gripping finger of the plurality of second gripping fingers.

8. The method of claim 7, wherein slidingly moving each of the first gripping fingers relative to a respective second gripping finger of the plurality of second griping fingers translates into a grip force and provides engagement of the plurality of magnets of each of the first gripping fingers with the plurality of magnets of the respective second gripping finger in a first condition.

9. The method of claim 7, wherein slidingly moving each of the first gripping fingers relative to a respective second gripping finger of the plurality of second gripping fingers translates into a grip release force and provides disengagement of the plurality of magnets of each of the first gripping fingers with the plurality of magnets of the respective second gripping finger in a second condition.

10. The method of claim 1, further comprising moving the first planar array of ceramic fibers from the processing apparatus with the first fiber gripper assembly subsequent to separation from the second planar array of ceramic fibers for additional processing.

11. The method of claim 10, further comprising moving the second planar array of ceramic fibers from the processing apparatus with the second fiber gripper assembly for additional processing subsequent to separation from, and moving, of the first planar array of ceramic fibers.

12. A ceramic fiber processing apparatus for the manufacture of a ceramic matrix composite (CMC) article, comprising:
a frame including a plurality of unidirectional ceramic fibers wound thereabout and extending across a void therein the frame to define a first planar array of ceramic fibers and a second planar array of ceramic fibers;
a first gripper assembly configured to grip the first planar array of ceramic fibers;
a second gripper assembly configured to grip the second planar array of ceramic fibers; and
a cutting mechanism to separate the first planar array of ceramic fibers and the second planar array of ceramic fibers from one another.

13. The apparatus claim 12, wherein the first gripper assembly comprises a plurality of first gripping fingers and a plurality of second gripping fingers and wherein the second gripper assembly comprises a plurality of first gripping fingers and a plurality of second gripping fingers.

14. The apparatus claim 13, wherein each of the plurality of first gripping fingers includes a plurality of magnets in an alternating N-S configuration and each of the plurality of second gripping fingers includes a plurality of magnets in an alternating N-S configuration.

15. The apparatus claim 14, wherein each of the plurality of first gripping fingers is moveable relative to a respective one of the second gripping fingers of the plurality of second gripping fingers.

16. The apparatus claim 15, further comprising one or more clamping cylinder mechanisms configured to clamp each of the first gripping fingers relative to a respective second gripping finger of the plurality of second griping fingers.

17. The apparatus claim 15, further comprising one or more sliding cylinder mechanisms to slidingly move each of the first gripping fingers relative to a respective second gripping finger of the plurality of second gripping fingers.

18. The apparatus claim 17, wherein during a first condition each of the first gripping fingers is slidingly moved relative to a respective second gripping finger of the plurality of second griping fingers providing engagement of the plurality of magnets of the first gripping fingers with the plurality of magnets of the second gripping fingers.

19. The apparatus claim 17, wherein during a second condition each of the first gripping fingers is slidingly moved relative to a respective second gripping finger of the plurality of second griping fingers providing disengagement of the plurality of magnets of the first gripping fingers with the plurality of magnets of the second gripping fingers.

20. A ceramic fiber processing apparatus for the manufacture of a ceramic matrix composite (CMC) article, comprising:
a frame including a plurality of unidirectional ceramic fibers wound thereabout and extending across a void therein the frame to define a first planar array of ceramic fibers and a second planar array of ceramic fibers;
a first gripper assembly comprising a plurality of first gripping fingers and a plurality of second gripping fingers and configured to grip the first planar array of ceramic fibers therebetween;
a second gripper assembly comprising a plurality of first gripping fingers and a plurality of second gripping fingers and configured to grip the second planar array of ceramic fibers therebetween; and
a cutting mechanism to separate the first planar array of ceramic fibers and the second planar array of ceramic fibers from one another,
wherein each of the plurality of first gripping fingers includes a plurality of magnets in an alternating N-S configuration and each of the plurality of second gripping fingers includes a plurality of magnets in an alternating N-S configuration.

* * * * *